(12) United States Patent
Weissman et al.

(10) Patent No.: US 7,757,100 B2
(45) Date of Patent: Jul. 13, 2010

(54) PROTECTED VOLUME ON A DATA STORAGE DEVICE WITH DUAL OPERATING SYSTEMS AND CONFIGURABLE ACCESS AND ENCRYPTION CONTROLS

(75) Inventors: Gregg D. Weissman, Los Gatos, CA (US); Hon Tran, San Jose, CA (US); Gregory W. Dalcher, Placerville, CA (US); Jay H. Hoffmeier, Burke, VA (US); James E. Zmuda, Foster City, CA (US); Mark J. Sutherland, Milpitas, CA (US); Michael T. Guttman, Newberry Park, CA (US)

(73) Assignee: Spyrus, Inc., San Jose, CA (US)

( * ) Notice: Subject to any disclaimer, the term of this patent is extended or adjusted under 35 U.S.C. 154(b) by 229 days.

(21) Appl. No.: 12/126,759

(22) Filed: May 23, 2008

(65) Prior Publication Data
US 2008/0263371 A1    Oct. 23, 2008

Related U.S. Application Data

(63) Continuation of application No. 11/085,777, filed on Mar. 21, 2005, now Pat. No. 7,380,140, which is a continuation of application No. 09/467,512, filed on Dec. 20, 1999, now abandoned.

(60) Provisional application No. 60/114,261, filed on Dec. 30, 1998.

(51) Int. Cl.
| G06F 11/30 | (2006.01) |
| G06F 12/14 | (2006.01) |
| G06F 9/00 | (2006.01) |
| G06F 15/177 | (2006.01) |
| H04L 9/32 | (2006.01) |
| H04L 9/00 | (2006.01) |
| G06F 12/00 | (2006.01) |
| G06F 13/00 | (2006.01) |
| G06F 13/28 | (2006.01) |
| G06F 15/167 | (2006.01) |

(52) U.S. Cl. ................. 713/193; 711/162; 711/161; 709/213; 713/2; 713/189; 713/161

(58) Field of Classification Search .................... 713/2, 713/161, 189, 193; 709/213; 711/161, 162
See application file for complete search history.

(56) References Cited

U.S. PATENT DOCUMENTS 5,214,695 A * 5/1993 Arnold et al. .................. 713/2

(Continued)

*Primary Examiner*—Shin-Hon Chen
(74) *Attorney, Agent, or Firm*—Norman R. Van Treeck; Sheldon Mak Rose & Anderson

(57) ABSTRACT

A method provides a protected region of a data storage device associated with a computational device, where data in the protected region is primarily protected by preventing access without proper access authorization. The method comprises the steps of providing, in an unprotected region of the data storage device, a first operating system and associated operating system data; monitoring operating system data accessed by the computational device until a predetermined functionality becomes available; storing, in the protected region, the monitored operating system data; providing, in the protected region, a second operating system; transferring control of the computational device from the first operating system to the second operating system; storing data in the protected region; and preventing access to the stored data in the protected region without access authorization. In a further embodiment of the method, the second operating system optionally provides a second level of security by preventing decryption of data stored in the protected region without decryption authorization.

24 Claims, 9 Drawing Sheets

U.S. PATENT DOCUMENTS 5,335,350 A * 8/1994 Felderman et al. ............ 455/17
5,434,562 A * 7/1995 Reardon ...................... 726/34
5,504,905 A * 4/1996 Cleary et al. ................ 713/100
5,809,230 A * 9/1998 Pereira ........................ 726/35
6,029,209 A * 2/2000 Cornaby et al. ................ 710/5

* cited by examiner

PROTECTED VOLUME ON A DATA STORAGE DEVICE WITH DUAL OPERATING SYSTEMS AND CONFIGURABLE ACCESS AND ENCRYPTION CONTROLS

CROSS-REFERENCE TO RELATED APPLICATION

This application is a continuation of U.S. patent application Ser. No. 11/085,777, filed Mar. 21, 2005, now U.S. Pat. No. 7,380,140, which is a continuation of U.S. patent application Ser. No. 09/467,512, filed Dec. 20, 1999, now abandoned, which claims the benefit of U.S. Provisional Patent Application Ser. No. 60/114,261, filed Dec. 30, 1998.

BACKGROUND OF THE INVENTION

1. Field of the Invention

This invention relates to protecting data stored on a data storage device.

2. Related Art

Many computational devices have a data storage device associated therewith. It can be desirable to protect sensitive data stored on the data storage device from unauthorized access. (Herein, "data" refers to any information stored on a data storage device, including instructions, e.g., a computer program, for operating the computational device.) In particular, it can be desirable to establish a defined region of the data storage device within which data cannot be accessed without proper authorization, the defined region being treated as a separate data storage "volume." Access to that volume (a "protected volume") can be prevented, and authorization to access the protected volume can be determined, using conventional cryptographic techniques.

Some methods of establishing a protected volume on a data storage device are discretionary, i.e., a user must take action to cause the protected volume to be established and/or to cause data to be stored within the protected volume. For some applications, it may not be desirable to allow a user to have such discretion, since such discretion means that there is no guarantee that data generated by the user will be stored within the protected volume. (For example, a user may consciously decide not to store data within the protected volume or may inadvertently neglect to ensure that such data storage occurs.) Additionally, since a user must take action to create, and store data within, the protected volume, protection of data using these methods is not transparent to the user. However, for a variety of reasons, transparent data protection may be desirable.

Some methods of establishing a protected volume do not provide for storing data representing the operating system of the computational device within the protected volume. Failure to protect the operating system data leaves the operating system open to an attack that can corrupt the operation of the operating system, in particular in a way that may damage sensitive data. Further, failure to protect the operating system data can make data more susceptible to unauthorized access. For example, temporary files that are created invisibly by the operating system can include sensitive data. In particular, an operating system is typically, on an ongoing basis, moving data into and out of a temporary file (e.g., a swap file) that is used to provide virtual memory on a non-volatile data storage device. Thus, sensitive data can be temporarily stored on a non-volatile data storage device, as opposed to a volatile data storage device such as a random access memory (RAM), so that the sensitive data remains stored in an unprotected region of the data storage device when power to the computational device is turned off. If the operating system data is not protected within the protected volume, sensitive data stored in the swap file can be susceptible to unauthorized access. (This danger can be particularly troublesome, since it is not known which sensitive data or how much sensitive data is stored in the swap file.) Thus, it can be desirable to protect the operating system data by storing the operating system data in a protected volume and, in particular, to effect such protection before the operating system is fully operational and a user is allowed to generate data for storage on a data storage device.

It may be possible to establish a protected volume within which all of the operating system data is stored, and to establish the protected volume so that the operating system data is stored within the protected volume beginning immediately after the computational device first begins to operate after a reset (either a hardware reset or a software reset), e.g., when a master boot record is accessed or when an operating system partition is accessed. However, problems can be encountered with this approach. For example, since the operating system data is—or will be, during the boot-up sequence in which the protected volume is first established—stored within a protected volume and is therefore not available to the computational device in a "normal" manner, the functions that would otherwise be provided by the operating system when the operating system boots up (i.e., as the functionality of the operating system is progressively made available) must be duplicated by the method for establishing and/or accessing the protected volume. In particular, it is difficult and/or expensive to provide an interface to an external high assurance device (e.g., a cryptographic token) that can provide the protection mechanisms for use in creating, and controlling access to, the protected volume. (Such an interface is typically already provided by the operating system.) Provision of these operating system functions—and, in particular, provision of these functions in a way that integrates with the existing operating system—as part of the method for creating and/or accessing a protected volume can cause operation of the computational device to be unstable and unreliable.

SUMMARY OF THE INVENTION

A first method provides a protected region of a data storage device associated with a computational device, where data in the protected region is primarily protected by preventing access without proper access authorization. The method comprises the steps of providing, in an unprotected region of the data storage device, a first operating system and associated operating system data; monitoring operating system data accessed by the computational device until a predetermined functionality becomes available; storing, in the protected region, the monitored operating system data; providing, in the protected region, a second operating system; transferring control of the computational device from the first operating system to the second operating system; storing data in the protected region; and preventing access to the stored data in the protected region without access authorization. In a further embodiment of the first method, the second operating system optionally provides a second level of security by preventing decryption of data stored in the protected region without decryption authorization.

Another method provides a protected region of a data storage device associated with a computational device, where data in the protected region is primarily protected by preventing decryption without proper decryption authorization. The method comprises the steps of providing, in an unprotected region of the data storage device, a first operating system and associated operating system data; monitoring operating system data accessed by the computational device until a predetermined functionality of the first operating system becomes available; storing, in the protected region, the monitored operating system data; providing, in the protected region, a second operating system; transferring control of the computational device from the first operating system to the second operating system; storing data in the protected region; and preventing decryption of the stored data in the protected region without decryption authorization. In a further embodiment, the second operating system optionally provides a second level of security by preventing access to data stored in the protected region without access authorization.

In further embodiments the second operating system is optionally different from the first operating system. The second operating system optionally prevents unauthorized access to data stored in the unprotected region of the data storage device.

In an optional further embodiment, the step of transferring control incorporates checking the operating system data stored in the unprotected region to determine whether the first operating system has been modified and, if so, preventing unauthorized access to the data in the protected region. In a still further embodiment, the step of checking operating system data comprises the steps of hashing operating system data to create a set of one or more hashes of the operating system data; comparing the set of one or more hashes of the operating system data to a set of one or more reference hashes previously stored in the protected region; and determining that the first operating system data has been modified if there is a difference in the comparison. Optionally, the set of one or more reference hashes is determined from hashing reference operating system data, and optionally, the set of one or more reference hashes is protected from undetected modification by authenticating one or more digital signatures.

Optionally, data in the protected region is further protected by authenticating a user identity. The user identity may be authenticated using the first operating system, using the second operating system, or using both the first operating system and the second operating system.

Optionally, data in the protected region is further protected by receiving an identification of one or more volumes to be protected, and, for each volume, one or more data protection parameters; associating the one or more data protection parameters with the one or more identified volumes; and selectively providing access to protected data or decryption of protected data in the one or more identified volumes as a function of the authorization of a user and the data protection parameters.

Additionally, apparatus is provided to execute the methods. Further, the methods may be embodied in software on a computer readable media.

DETAILED DESCRIPTION OF THE INVENTION

Figure 1A:
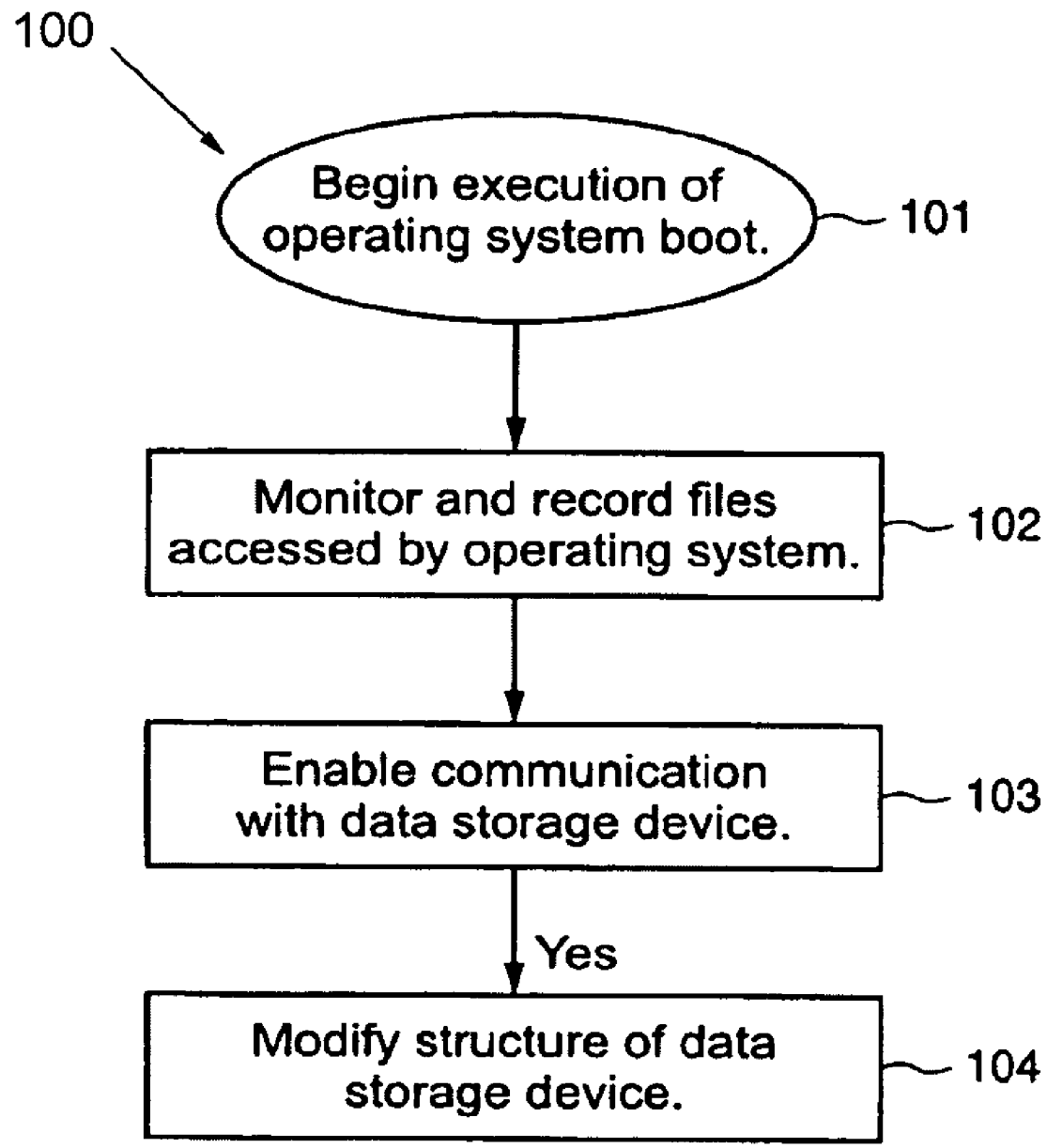
FIG. 1A is a flow chart illustrating a method, according to an embodiment of the invention, for establishing a protected volume of a data storage device.

The invention enables a protected volume of a data storage device to be established in a manner that overcomes the above-described limitations of previous methods of establishing a protected volume. In accordance with the invention, as the functionality of a computational device's operating system is progressively made available (i.e., as the operating system boots up) after a reset (which can be either a hardware reset or a software reset) of the computational device, the operating system data (for convenience, sometimes referred to hereafter as the "cleartext operating system data") that is accessed by the operating system is monitored and recorded. After the operating system boot-up progresses to a point (the "volume conversion crossover point") at which predetermined functionality of the operating system becomes available, a protected volume can be established on the data storage device. A copy of the cleartext operating system data is stored in an unprotected region (i.e., a region that is not part of the protected volume) of the data storage device. A copy of the cleartext operating system data is also stored in the protected volume.

After the protected volume is established, the computational device can be operated in a secure mode in which only data stored in the protected volume can be accessed (including the copy of the cleartext operating system data) and all new data to be stored on the data storage device is stored in the protected volume. Upon reset of the computational device after the protected volume is established, the operating system begins to boot up using the cleartext operating system data stored in the unprotected region. The cleartext operating system data in the unprotected region is used until the volume conversion crossover point, at which time operation of the computational device converts to the secure mode.

Since the invention enables an operating system boot of a computational device that will be operated in secure mode (i.e., so that a protected volume of a data storage device can be used) to begin with normal (i.e., unprotected) operating system data (the cleartext operating system data), the reliability and stability of operation of the computational device is greatly increased as compared to a computational device in which all operating system data is stored within a protected volume, as described above. Further, a method of the invention can enable the functionality provided by the cleartext operating system data to be provided during operating system boot without need to duplicate such functionality as part of the method (thus avoiding the associated expense and complexity).

As indicated above, the cleartext operating system data stored in the unprotected region enables predetermined operating system functionality to be provided. It is generally desirable to specify the cleartext operating system data so as to provide more operating system functionality, thereby reducing the instability or unreliability that is introduced into the operating system operation, and reducing the cost of duplicating operating system functionality in a method according to the invention for completing operating system boot-up in a secure mode. However, it is also generally desirable to minimize the amount of cleartext operating system data (and, thus, the extent of operating system functionality) so as to decrease the opportunity for attacks on the operating system. The amount of cleartext operating system data (and, correspondingly, the extent of operating system functionality) is specified in view of these considerations.

The invention is preferably implemented so that the cleartext operating system data enables communication with the data storage device. It can also be desirable to implement the invention so that the cleartext operating system data enables both user interface functionality and token support functionality of the operating system. This functionality facilitates presentation of a user interface that can be used for user authentication, and use of a token in such authentication as well as protection of the protected volume. It may be desirable to enable other operating system functionality with the cleartext operating system data, such as, for example, complete protect-mode memory management (this can reduce or eliminate the need to reproduce complex memory management logic in a method of the invention, and provide the benefits of a large protected-mode memory space); multitasking and multithreading capabilities; other system drivers that enable input from, and output to, various sources, such as, for example, network connections, asynchronous communications devices (modems), Universal Serial Bus devices and smart-cards; complete file system access (this enables standard file system calls to be used to manage any cleartext storage desired, including access to volumes where no protection is desired); and/or the Microsoft CryptoAPI (this provides native cryptographic functions and certificate management). In any event, since the invention leaves only a relatively small part of the operating system data unprotected, the danger of an attack that can corrupt the operation of the operating system is reduced. Moreover, as described further below, the invention can be implemented so that a further security mechanism which provides tamper detection is applied to the "unprotected" part of the operating system.

Additionally, an important aspect of the invention is that the protected volume is established prior to storage of sensitive data in temporary files used by the operating system (e.g., files used for backup copies of other files; temporary working files, such as compiler intermediate files, containing data for memory intensive operations). Further, as a consequence, any such temporary files are stored within the protected volume. Therefore, such files cannot be accessed without authorization to access the protected volume. In particular, a temporary file that is used to provide virtual memory on the data storage device is protected. (Herein, for convenience, such a temporary file is sometimes referred to as a "swap file.") Thus, the invention eliminates the danger, associated with some previous methods of establishing a protected volume on a data storage device, that sensitive data stored temporarily on a data storage device during operation of a computational device remains stored in an unprotected region of the data storage device when power to the computational device is turned off, rendering that data susceptible to unauthorized access.

Additionally, the invention is preferably implemented so that all data stored on the data storage device, other than the cleartext operating system data stored in an unprotected region, is automatically stored in a protected volume. The removal of user discretion from the protection of data ensures that data cannot be intentionally or unintentionally left unprotected. Additionally, such automatic storage of data in the protected volume makes protection of data transparent to the user, eliminating complexity from the user's interaction with the computational device that may otherwise be introduced by requiring user interaction to effect data protection.

Generally, the invention can be implemented to establish a protected volume on any type of data storage device. Thus, for example, a protected volume can be established on a hard disk or a removable data storage medium (e.g., a Zip disk or similar disk).

FIG. 1A is a flow chart illustrating a method 100, according to an embodiment of the invention, for establishing a protected volume of a data storage device. As shown by block 101, a boot of the operating system begins after reset of the computational device with which the data storage device is associated. The beginning of an operating system boot, while not a step of a method according to the invention, is a necessary antecedent to performance of a method according to the invention for establishing a protected volume of a data storage device, as well as a method according to the invention for operating the computational device in a secure mode after the protected volume has been established.

In step 102 of the method 100, the accessing of files as the operating system boot progresses is monitored and recorded, and the identity of the accessed files is recorded. In general, operating system activity is intercepted in a non-intrusive way, and activity that relates to access to files (e.g., read, open, search or execute operations) is identified and information regarding the file to be accessed is stored. A particular way in which this can be done is described in more detail below.

As shown by step 103 of the method 100, as the operating system boot progresses, eventually communication with the data storage device is enabled. In the method 100, once at least this operating system functionality is available, the monitoring and recording of access to operating system data in step 102 can cease (thus establishing the volume conversion crossover point) and the protected volume(s) can be established. For a particular operating system, the particular point at which this occurs can be identified by those skilled in the art for use in implementing the method 100.

In step 104, the structure of the data storage device is modified so that one or more protected volumes are established on the data storage device. The manner in which this can be done is described in more detail below with respect to FIG. 4 and TABLE I. A copy of the operating system data accessed up to this point (recorded in step 102) is stored in an unprotected region of the data storage device. A copy of that operating system data is also stored in a protected volume.

As explained in more detail below, in subsequent secure operation of the computational device after a protected volume has been established, the operating system data stored in the unprotected region is used during boot up of the operating system until the volume conversion crossover point is reached. (During an operating system boot up after the protected volume is established, there is no need to monitor and record access to operating system data.) At that point, secure operation begins (assuming that the user is an authorized user), access being allowed only to data stored in the protected volume(s). Any access to operating system data that is available in the unprotected region is made to the copy of that operating system data that is stored in the protected volume(s).

Figure 1B:
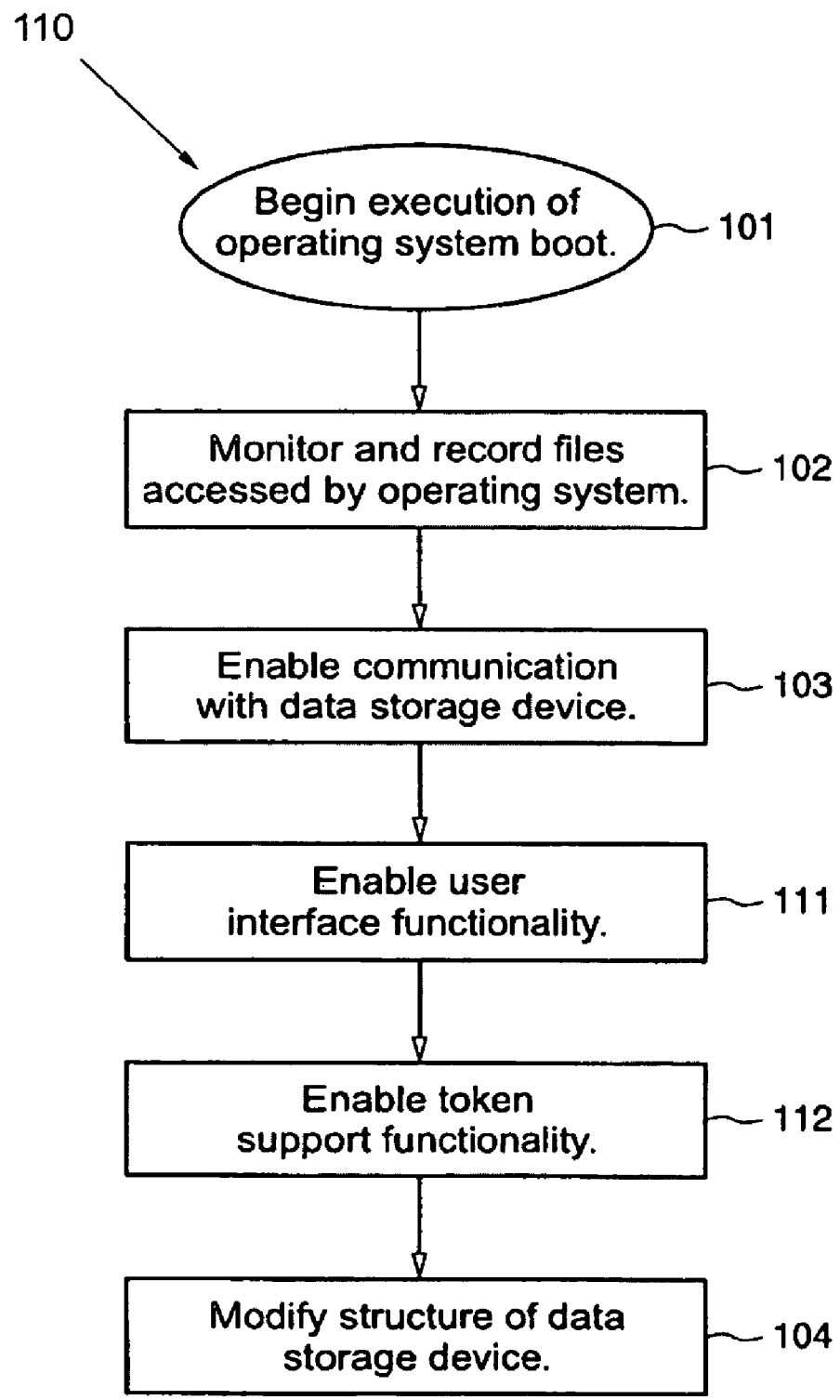
FIG. 1B is a flow chart illustrating a method, according to another embodiment of the invention, for establishing a protected volume of a data storage device.

FIG. 1B is a flow chart illustrating a method 110, according to another embodiment of the invention, for establishing a protected volume of a data storage device. As in the method 100 (FIG. 1A), a boot of the operating system begins, as shown by block 101, the accessing of files as the operating system boot progresses is monitored and recorded (step 102) until communication with the data storage device has been enabled (step 103). However, in the method 110, before the structure of the data storage device is modified to establish protected volume(s) (step 104), two additional aspects of operating system functionality are allowed to become available. In step 111, the user interface functionality of the operating system is enabled. In step 112, the token support functionality of the operating system is enabled. Until both the user interface and token support functionality are enabled, the method 110 does not proceed with modification of the structure of the data storage device (step 104).

Figure 1C:
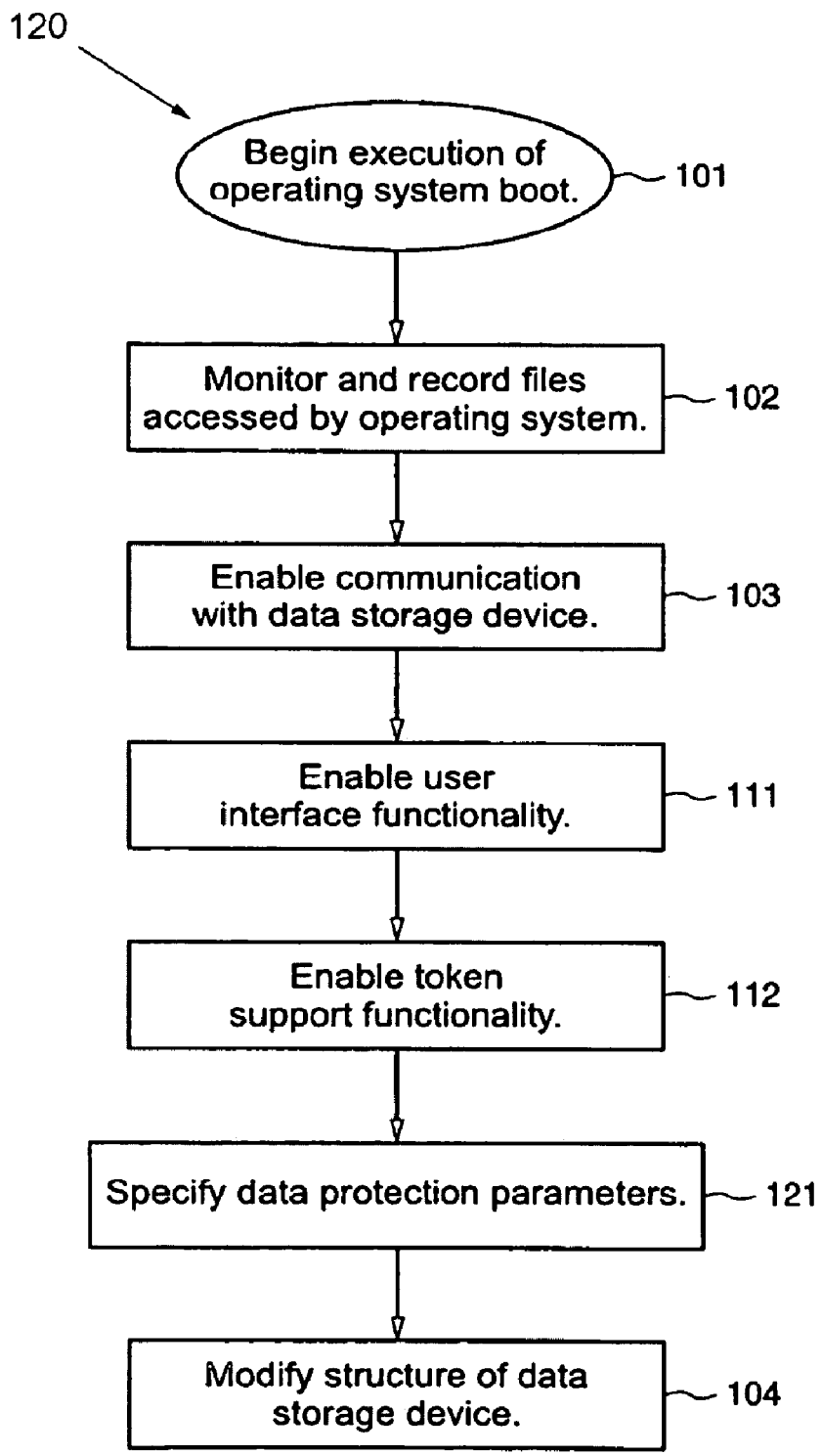
FIG. 1C is a flow chart illustrating a method, according to still another embodiment of the invention, for establishing a protected volume of a data storage device.

FIG. 1C is a flow chart illustrating a method 120, according to still another embodiment of the invention, for establishing a protected volume of a data storage device. As in the methods 100 (FIG. 1A) and 110 (FIG. 1B), a boot of the operating system begins, as shown by block 101, and the accessing of files as the operating system boot progresses is monitored and recorded (step 102) until communication with the data storage device has been enabled (step 103). Further, as in the method 110 (FIG. 1B), before the structure of the data storage device can be modified (step 104), the user interface functionality of the operating system (step 111) and the token support functionality of the operating system (step 112) have also been enabled. In the method 120, once the user interface functionality and the token support functionality of the operating system have been enabled, in step 121, a user interface is presented that enables specification of one or more data protection parameters (e.g., designation of which volumes are to be protected). This can be desirable to allow some discretion in the protection of data to a user who is establishing protected volume(s) on a data storage device.

Figure 2A:
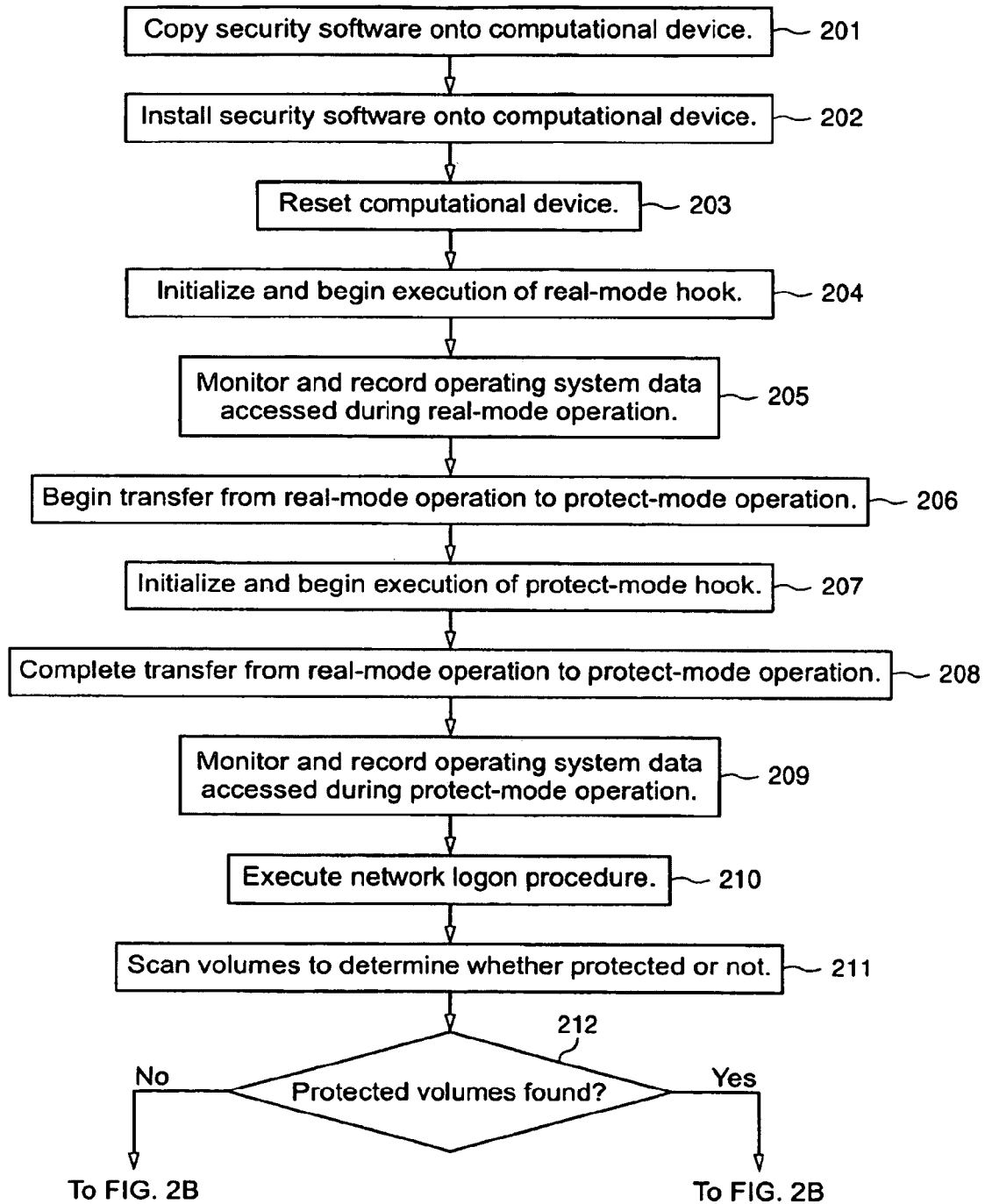
FIGS. 2A and 2B are, together, a flow chart illustrating use and operation of one or more computer programs that implement a method according to an embodiment of the invention.
Figure 2B:
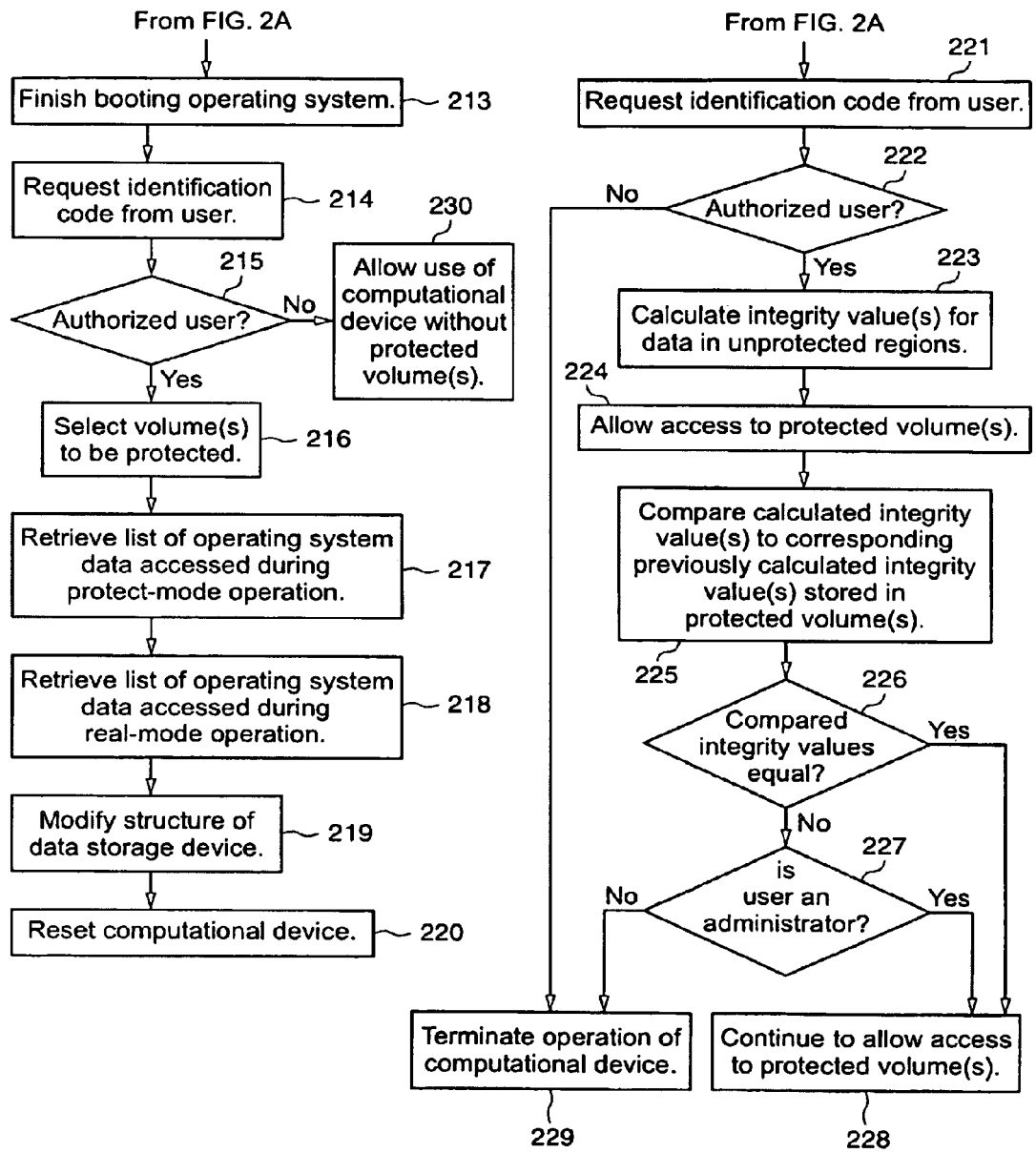

FIGS. 2A and 2B are, together, a flow chart illustrating use and operation of one or more computer programs that implement a method according to an embodiment of the invention. (For convenience, the computer program(s) are sometimes referred to hereafter as the "security software.") The security software is installed and operates on a computational device including data storage device(s) within which one or more protected volumes are to be established. The flow chart of FIGS. 2A and 2B is described with respect to a computational device operated in accordance with a DOS or Windows operating system. For a computational device operated in accordance with another operating system, the particular manner in which aspects of the use and operation described with respect to FIGS. 2A and 2B are implemented can differ from the way of accomplishing those aspects as discussed below. However, those skilled in the art will appreciate, in view of the description herein, how to effect such particular implementations.

First, as shown by step 201, the security software is copied onto a data storage device of the computational device. This can be accomplished using conventional methods and apparatus, as is well known.

In step 202, the security software is "installed" on the computational device. In particular, installation of the security software causes commands to be inserted in several operating system files (such as the registry, CONFIG.SYS AND SYSTEM.INI files used in DOS or Windows operating systems) that cause execution of the security software when the operating system boots up after a subsequent reset of the computational device.

In step 203, a reset (either a hardware reset or a software reset) of the computational device is executed. The reset causes the operating system to begin booting up, starting with what is termed "real-mode operation." In general, the operating system functionality implemented in the real-mode portion of an operating system is known to those skilled in the art.

Illustratively, for a personal computer operating in accordance with a DOS or Windows operating system, an operating system boot begins as follows. First, the BIOS (Basic Input/Output System), typically stored in a read-only memory (ROM), begins executing. Execution of the BIOS causes a master boot record, stored at a known location of a data storage device of the computational device, to be accessed and the instructions stored therein to be executed. These instructions identify an operating system partition on a data storage device of the computational device. The first sector of the operating system partition is accessed and the instructions stored therein are executed (i.e., the file IO.SYS). Successive instructions are further executed, the execution of additional instructions progressively making additional aspects of the operating system functionality available until, eventually, all of the operating system functionality is available.

In step 204, after the beginning of execution of the first driver invoked by execution of the CONFIG.SYS file, the real-mode hook of the security software initializes and begins executing. If a protected volume exists (i.e., if the steps 201 through 220 have previously been performed), the real-mode hook prevents operating system device drivers from executing TO WRITE operations (including those that are not associated with an access to a file) to the data storage device on which the operating system data is stored.

The real-mode hook also causes access to operating system data to be monitored and recorded (i.e., file path), as shown by step 205. This can be accomplished using facilities provided in a DOS or Windows operating system, as known to those skilled in the art. In general, the real-mode hook records all file accesses during real-mode operation of the operating system. However, accesses to files which refer to system devices (e.g., peripheral devices) are not logged.

Additional operating system files are executed until, eventually, as shown in step 206, operating system boot-up begins preparation for transfer from the real-mode environment to the protect-mode environment. In a Windows operating system, this preparation commences with execution of the file WIN.COM. The operating system gradually transitions from real-mode operation to protect-mode operation. In protect-mode operation, various additional drivers are executed. For example, in a Windows operating system, drivers that provide "Services" and network logon capability are executed. In general, the operating system functionality implemented in the protect-mode portion of an operating system is known to those skilled in the art.

In step 207, the protect-mode hook of the security software initializes and begins executing. In step 208, the operating system completes the transition to protect-mode operation. If a protected volume exists (i.e., if the steps 201 through 220 have previously been performed), the protect-mode hook prevents operating system device drivers from executing IO WRITE operations to the data storage device on which the operating system data is stored. The integration of a protect-mode hook according to the invention into a DOS or Windows operating system is described in more detail below.

The protect-mode hook also causes access to operating system data to be monitored and recorded, as shown by step 209. As with the real-mode hook (step 205), this can be accomplished using facilities provided in a DOS or Windows operating system, as known to those skilled in the art. The protect-mode hook only records accesses to files for which a file open request results in a successful file open operation.

The operating system continues to load additional files that make further operating system functionality available, as described above, until eventually, in step 210, a operating system logon procedure can be executed. In accordance with the invention, the security software includes computer instructions that are executed at this point that enable presentation of a user interface that enables user authentication for purposes of establishing (or using) a protected volume (though the user interface is not yet presented to the user).

In a DOS/Windows operating system, the files necessary to enable communication with data storage devices, provide a user interface and provide token support (e.g., PCMCIA card driver(s), smart card driver(s)) are loaded prior to execution of the network logon procedure. Availability of the operating system functionality that enables communication with data storage devices is important to enable subsequent performance of the steps of a method according to the invention that establish a protected volume, as described further below. Further, availability of the token support and user interface functionality of the operating system is important to enable provision of a user interface that can be used to authenticate a user. While this functionality could be independently provided as part of security software according to the invention (in a manner similar to the above-described method for providing a protected volume in which all of the operating system data is stored within the protected volume beginning immediately after the computational device first begins to operate after a reset), use of the native operating system functionality simplifies and reduces the cost of developing the security software, and reduces instability and unreliability that may otherwise be introduced into operation of the operating systems as a result of the need for "foreign" software to interact with the operating system to provide this functionality. It is an important advantage of the invention that certain native operating system functionality (such as data storage device communications, user interface and token support functionality) can be made available prior to operation of the computational device in secure mode.

In step 211, the security software scans all of the data storage volumes associated with the computational device, identifying for each volume whether the volume is a protected volume established by the security software. In step 212, the security software makes a determination as to whether any of the data storage volumes associated with the computational device are volumes that have been established as a protected volume by the security software. If so, then, further instructions of the security software are executed, as described in more detail below, to enable conversion of operation of the computational device to secure operation. If not, then, the security software establishes one or more protected volumes, as follows.

In step 213, the remainder of the operating system boots up so that all operating system functionality is available.

In step 214, the security software presents a user interface to the user that prompts the user to enter an identification code (e.g., PIN). In step 215, the identification code is checked to determine if the user is an authorized user.

If the user is not an authorized user, then, in step 230, use of the computational device is allowed without establishing protected volume(s). In other words, the computational device is used as would otherwise be the case without implementation and execution of a method according to the invention.

If the user is an authorized user, then, in step 216, the user is presented with a further user interface that allows the user to designate one or more volumes to be established as a protected volume. Upon selection of the volume(s) to be protected, the security software begins the process of establishing the protected volume(s).

In step 217, the list of operating system data accessed during protect-mode operation (recorded in step 209) is retrieved by the security software.

In step 218, the list of operating system data accessed during real-mode operation (recorded in step 205) is retrieved by the security software. This can be accomplished using a mechanism provided by the operating system for communicating (e.g., software interrupt 2F) between the operating system protect-mode environment and the operating system real-mode environment.

In step 219, the structure of the data storage device is modified so that each volume selected by the user in step 216 is established as a protected volume. The manner in which this can be done is described in more detail below with respect to FIG. 4 and TABLE I.

In step 220, the computational device is reset. After the reset, steps 204 through 212 of the method 200 are performed again.

Returning to step 212, if the security software makes a determination that one or more protected volumes already exist, then, in step 221, the security software presents a user interface to the user that prompts the user to enter an identification code (e.g., PIN). Upon entry of an acceptable identification code (e.g., PIN) in step 222, the security software proceeds with conversion of operation of the computational device to secure operation. Otherwise, operation of the computational device is terminated, as shown by step 229.

As discussed above, a method according to the invention for establishing a protected volume results in part of the operating system data being stored within an unprotected region of a data storage device. This operating system data is susceptible to attack that can corrupt the operation of the operating system, in particular in a way that may damage sensitive data. To reduce or minimize this danger, the invention can further include a method for providing security for the unprotected operating system data so that unauthorized access to that data can be detected prior to allowing secure operation of the computational device.

First, in step 223, an integrity value is calculated for the data stored in the unprotected region(s) of the data storage device(s). This can be done in any appropriate manner. For example, a set of cryptographic hash operations can be performed on operating system data in the unprotected region. In one implementation, a cryptographic hash (using, for example, the SHA-1 algorithm) is performed on the files stored in the unprotected region. The cryptographic hash performed on the files can include data extending beyond the logical end of file up to the end of the last sector the operating system has allocated for the file's storage (slack space), so that the presence of attack code or data in the slack space can be detected. Another cryptographic hash is performed on the boot sector, file allocation tables and root directory. Still another cryptographic hash is performed on all of the remaining unused space in the unprotected region. (During the process of establishing the protected volume(s), the unused space of the unprotected region is written at least one time with pseudorandom data, thus making it difficult to hide attack code or data in those areas of the data storage device.)

In step 224, the security software allows access to the data stored in the protected volume(s). If this is the first operating system boot-up after the protected volume(s) have been established, the results of the integrity calculation are stored in a protected volume and steps 225, 226 and 227, discussed below, are not performed. Otherwise, once access to the data stored in the protected volume(s) is allowed, previously calculated integrity value(s) corresponding to those calculated in step 223 (and stored in step 224 of a previous execution of the method 200) are retrieved from the protected volume(s).

In step 225, the currently calculated integrity value(s) are compared to the stored integrity value(s). As an additional safeguard, the complete file image of the data (e.g., computer program) for computing the cryptographic hashes (which is stored in the unprotected region) can be compared with the file image of a copy of the same data that is stored in a protected volume.

In step 226, a determination is made as to whether each of the comparisons made in step 225 indicate that the compared integrity values are the same. If so, step 226 proceeds to step 228, secure operation of the computational device is allowed to continue. An important advantage of the use of the steps 223 through 226 to safeguard the unprotected region is that the data (e.g., computer program) used to effect those steps cannot be accessed unless a user is authenticated, thus making tampering with that data difficult.

If the integrity values do not match in step 226, a determination is made as to whether the user is also a system administrator in step 227 (discussed elsewhere herein).

If the user is a system administrator, step 227 proceeds to step 228, where secure operation of the computational device is allowed to continue. A warning message is displayed and information made available as to what differences were detected. The system administrator would typically at this point perform diagnostic procedures on the unprotected part of the data storage device(s) to attempt to determine why one or more of the pairs of corresponding integrity values were not equal, since a mismatch of corresponding integrity values may indicate an attempt to breach the security of the protected volume.

If, in step 227, the user is not a system administrator, then operation of the computational device is terminated by proceeding to step 229. The computational device cannot be operated again until a user that is also a system administrator is authenticated. This is done to provide additional security for the protected volume when a condition has been detected (i.e., a mismatch of integrity values) that may indicate an attempt to breach the security of the protected volume.

Once a protected volume has been established on the data storage device (steps 201 through 220) and the computational device is being operated in secure mode (steps 204 through 212 and 221 through 228), additional protected volumes can be established by providing a mechanism for the user to cause steps 216 through 220 of the method 200 to be executed again.

Figure 3:
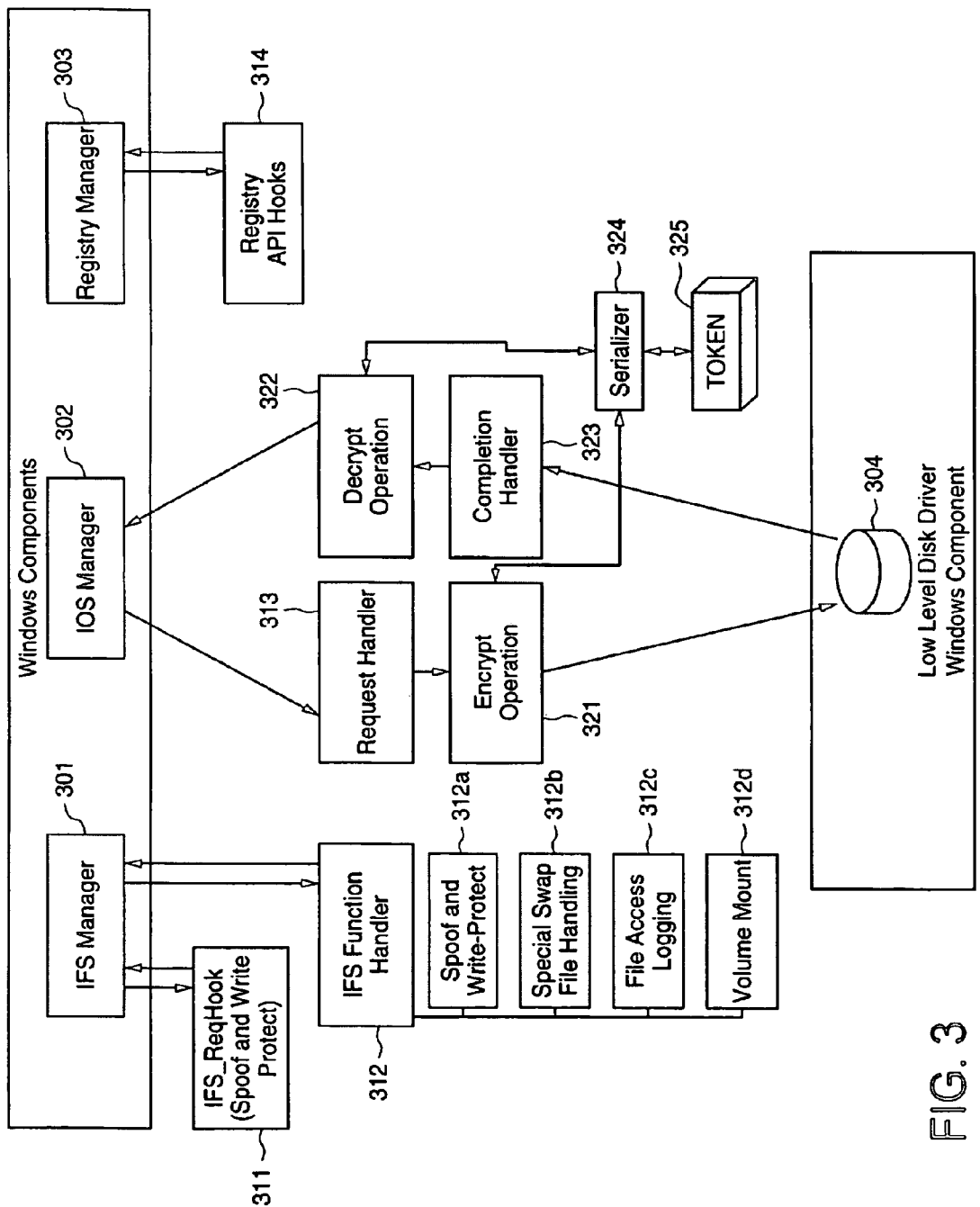
FIG. 3 illustrates integration of a protect-mode hook used in a method according to the invention into a DOS or Windows operating system.

FIG. 3 illustrates integration of a protect-mode hook used in a method according to the invention into a Windows operating system. The Windows operating system proceeds through several well-defined stages during boot-up to the point at which protect-mode drivers are initialized. Windows calls into several pre-defined entry points in each protect-mode driver, as known to those skilled in the art. During initialization of the protect-mode hook (step 207 of the method 200 of FIGS. 2A and 2B), Windows activity results in three calls to the protect-mode hook.

The protect mode hook is first called in response to the Windows call to SysCriticalInit. At this time, the protect-mode hook initializes volume data structures for later use by the protect-mode hook. Also at this time, the protect-mode hook is initially set to a state that causes all IO WRITE operations to the volume to be "spoofed." This protects the cleartext operating system data from being modified. Next, a call is made to initialize the Vendor Supply Driver (VSD) portion of the protect-mode hook. It is at this point that the protect-mode hook attaches itself to the Windows IO subsystem, causing subsequent protect-mode IO operations to the data storage device to be routed through the protect-mode hook. This allows the protect-mode hook to analyze each disk request and process the request as described in more detail below. Attaching the protect-mode hook to the Windows IO subsystem is accomplished via the IOS_Register call provided by the operating system.

Next, a call is made to initialize the Vendor Supply Driver (VSD) portion of the protect-mode hook. It is at this point that the protect-mode hook attaches itself to the Windows IO subsystem, causing subsequent protect-mode IO operations to the data storage device to be routed through the protect-mode hook. This allows the protect-mode hook to analyze each disk request and process the request as described in more detail below. Attaching the protect-mode hook to the Windows IO subsystem is accomplished via the IOS_Register call provided by the operating system.

Additionally, in response to the call to SysCriticalInit, described above, the call RegRemapPreDefKey made by the operating system is redirected to the protect-mode hook to enable registry redirection, as described in more detail below.

The second call to the protect mode hook is in response to the "InitComplete" processing performed by Windows. At this time the protect-mode hook checks each data storage volume to determine if the volume is a protected volume and accordingly sets a flag that is used during other operations.

Early initialization of cryptographic modules is performed at this time. This cryptographic initialization sets the cryptographic states for each volume to indicate unprotected status, meaning that the volume is not being accessed in encrypted mode.

The third call to the protect-mode hook during initialization of the protect-mode hook is in response to the Windows call to "OnDeviceInit." At this time, file system level API is hooked by the protect-mode hook. Hooking the file system level API is an important aspect of the protect-mode hook. At this time, memory is allocated to hold the list of files used during boot, option flags are read from configuration files, the location of the system swap file is determined, and the protect-mode hook entry point for handling file system API calls is specified.

At this point, the initialization of the protect-mode hook is complete. The sector TO handlers and the file system API handler from this point on are able to intercept and, if necessary, modify both file system and sector level IO operations, as described further below.

In further describing the operation of the protect-mode hook, the following major components are described: 1) the file system API hook (i.e., the IFS_ReqHook 311 and the IFS function handler 312), 2) the sector level IO hook (i.e., the request handler 313 and the completion handler 323), and 3) the registry API hook 314.

Referring to FIG. 3, the IFS Manager 301 is a Windows module responsible for file system handling, such as OPEN, CLOSE, and READ name operations. The protect-mode hook intercepts processing at two places in the IFS manager 301, as described below.

The IOS Manager 302 is a Windows module responsible for routing data storage device requests through the drivers that are responsible for handling different storage devices associated with the computational device.

The Registry Manager 303 is a collection of Windows functions responsible for accessing data in the registry. Those functions are intercepted by the protect-mode hook to support the methods of using a second copy of the registry as described in more detail below.

The IFS_ReqHook 311 protects the cleartext operating system data against unwanted modification during operating system boot-up. It is during the "OnDeviceInit" phase described above that this portion of the IFS manager 301 is hooked to provide this protection. The "IFSMgr_SetReqHook" function is called to hook the file attributes and file open functions, as described in Windows device driver documentation. The IFS_ReqHook 311 prevents file attribute calls from specifying an attribute change command. The IFS_ReqHook 311 also prevents file open commands from specifying that a file be opened in a writable mode.

The IFS function handler 312 includes several components: a spoof and write-protect module 312a, a special swap file handling module 312b, file access and logging module 312c, and a volume mount module 312d. Each of the modules 312a, 312b, 312c and 312d are described in further detail below.

The spoof and write-protect module 312a prevents modifications to the cleartext operating system data. This is accomplished as follows. File IO WRITE, IO DELETE, and IO RENAME functions (file access functions) are detected. If the file access function refers to a file on a protected volume and the protect-mode hook is not yet operating in secure mode, then the file access function is not allowed to proceed to subsequent operating system components that actually carry out the operation. Instead the file access function is "spoofed" so that the IOS manager 302 receives a success status from the operation without the normal result of the operation actually having occurred.

The special swap file handling module 312b manages the operating system swap file. This is accomplished as follows. When the IFS function handler 312 receives a file open request, the swap file handling module 312b takes action based on the results of several determinations. If the requested file references the swap file, if the operating system is still initializing and accessing the cleartext operating system data, and if the volume where the requested file is referenced is a protected volume, then the file open operation is modified to specify an "ACTION_OPENEXISTING" option that is part of the swap file handling module 312b. Because modification of the structure of a data storage device to establish a secure volume creates a zero length dummy entry representing the swap file (as described below with respect to FIG. 4), this option succeeds without any changes being written to the data storage device. Similarly, when the IFS function handler 312 receives a file write request, the swap file handling module 312b takes action based on the results of several determinations. If the referenced file refers to the swap file, if the operating system is still initializing and accessing the cleartext operating system data, and if the volume where the requested file is referenced is a protected volume, then an error is returned to the operating system for the operating system to handle appropriately, unless the IO WRITE operation is zero length (in which case the operation is simply specifying a new end of file position). If the file open operation is determined to be specifying a new end-of-file position for the swap file, the new end-of-file position is stored by the protect mode hook for later use when full access to the protected volume is allowed (step 228 of the method 200). If none of the previous tests have determined that the swap file access needs to be failed by the security software, another series of checks is made to see if access to the swap file should be permitted. If the operating system is still initializing and accessing the cleartext operating system data and the swap file is stored on a protected volume, then any of the following calls will result in an error return at this point: IO READ, IO WRITE, SEEK, CLOSE, COMMIT, LOCK, DATE and TIME CHANGE, HANDLE INFO, ENUMERATE.

The file access and logging module 312c handles recording accesses to files during protect-mode operation of the operating system. The IFS function handler 312 processes file operations that indicate the use of a file before switching to secure mode. Any files which are successfully opened are added to a list which is processed by the security software installation and set-up procedure. It is assumed that any file which is successfully opened will need to be retained in the unprotected region of the data storage device.

The volume mount module 312d, which responds to an IO MOUNT operation intercepted by the protect-mode hook, determines whether the volume being mounted by the operating system is a protected volume and, if so, initializes cryptographic parameters and data stored for later use by the protect-mode hook that will allow the sector IO handler to access the encrypted portions of the volume. First, the volume mount module 312d schedules the operating system to complete processing such that the operating system does not place any restrictions on the operations that the protect-mode hook can perform. When this point is reached, a flag is set that prevents changes to the volume (i.e., the volume is spoofed). Next, the "volume remapping file" is loaded. The volume remapping file defines a mapping of sector addresses from sectors in a range of sectors in the unprotected region of the data storage device known as the system area to sectors in a protected volume of the data storage device. The volume remapping file also defines a list of all sectors in the unprotected region of the data storage device. This information is used as described elsewhere herein with respect to the sector IO handler. Next, cryptographic parameters for the volume are initialized. This includes obtaining key exchange information from a list of users stored on the data storage device, retrieving an encrypted volume key from the user information, and using a key exchange algorithm to derive a volume key which can then be stored on a cryptographic device associated with the computational device.

The request handler 313 receives requests from the IOS Manager 302 for sector level IO operations. First, the request handler determines if the security software is in a state that requires that IO WRITE operations be spoofed. This determination is based on the state of the data storage device, the state of the security software, whether system shutdown, exit or reboot is in progress, and whether spoofing is to be enabled at all (as specified by the system initialization file). If spoofing occurs, then a success is reported to the caller and no further processing of the WRITE request occurs.

The request handler 313 also determines whether access to the volume is denied, and, if so, an error is returned to the operating system for the operating system to handle appropriately. Next, the request handler 313 determines whether the protected volume has been set to a state that allows encrypted access. If so, then the sector address of the intercepted sector level IO operation is checked against the list of sector addresses of the unprotected region of the data storage device. If a match is found, and the operation is an IO WRITE operation, the IO WRITE operation is spoofed. This eliminates any possibility of a change occurring to the cleartext operating system data. If the sector address for the intercepted sector level IO operation is in the list of sector addresses of the unprotected region of the data storage device and the operation is an IO READ, no further processing is performed by the request handler 313 and the operation is not scheduled to be handled by the completion handler 323, but, rather, is passed to the next handler in the call chain and is of no further interest. Otherwise, if the sector address is not in the unprotected region of the data storage device, and the computational device is operating in secure mode or is in the process of establishing a protected volume, then this indicates a sector operation that must be encrypted (if an IO READ operation) or decrypted (if an IO WRITE operation). If the volume is not in the process of being initially converted to secure format, any sector address referring to a certain range of sectors in the unprotected region of the data storage device known as the system area is re-mapped to an encrypted copy of that sector in the protected volume. This causes any operating system function that would ordinarily access the system area of a data storage device to instead access a copy of the system area stored in the protected volume. After the re-mapping operation, a state calculation is performed to determine whether the data, which might be a re-mapped sector address, is actually to be encrypted. The state calculation is performed as follows. If the data storage device is not a floppy disk or the sector address is greater than or equal to the sector address which starts in a protected volume of the floppy disk, if the volume state is either not in the conversion process or the sector address is within that portion of the data storage device which has already been converted to a protected volume, and if the operation is an IO WRITE operation, then all of the data in the current IO WRITE operation are encrypted (as described below with respect to the encryption mechanism 321) and the operation is scheduled to be handled by the completion handler 323 (as described below) after the data is passed to the next handler in the call chain for this volume (which results in the data being written to the data storage device). If the above state calculations fail, the operation is passed to the next handler in the call chain and is of no further interest.

An encryption mechanism 321 collects all of the sectors of data to be encrypted into a single list, and then applies a cryptographic operation. The specifics of the cryptographic operation can vary depending on the selection of cryptographic algorithm, and cryptographic mode. (Examples of cryptographic algorithms that can be used with the invention are described in more detail below.) For example, the ECB mode of the Skipjack algorithm can be used. Additionally, it can be advantageous to, prior to encrypting data, pre-process the data according to the volume number, the sector address, initialization vectors, and the data itself, thereby providing additional cryptographic strength.

A token 325 performs the actual encryption. (The token 325 also performs decryption, described further below.) While a token need not necessarily be used to perform encryption, the use of a token is preferable to provide additional security for the encryption operation. The token 325 can be, for example, a Fortezza™ PCMCIA card sold by Spyrus, Inc. of Santa Clara, Calif.

A serializer 324 is used to control access to the token 325 which performs the actual encryption, as described below. In particular, the serializer 324 controls multiple events that may seek to use the token 325 at the same time (where the times at which events seek to make use of the token 325 is not known beforehand) to make use of the token 325 so that only one event uses the token 325 at any time. A particular way in which the serializer 324 can be implemented is described in more detail in the commonly owned, co-pending U.S. patent application Ser. No. 09/468,028, entitled "Event-Driven Serialization of Access to Shared Resources, by Gregg Weissman et al., filed on Dec. 20, 1999, and issued as U.S. Pat. No. 6,295,602 on Sep. 25, 2001, the disclosure of which is incorporated by reference herein.

A Windows low level disk driver 304 mediates access to the data storage device resultant from IO READ and IO WRITE operations requested by the protect-mode hook. The disk driver 304 is handed control once the request handler 313 has finished processing an IO WRITE operation or has passed along an IO READ request. The techniques for doing this are familiar to one of skill in the art.

Control is returned to the protect-mode hook from the disk driver 304 via the IOS Manager 302, which calls a completion handler 323. The completion handler 323 receives data from the data storage device after an intercepted sector) level IO READ operation, then decrypts the data and passes the data to higher level operating system modules to be presented to application programs for use by those programs. First, the completion handler 323 performs a state calculation to determine whether the data coming from data storage device is to be decrypted. This state calculation mimics the state calculations for encryption in the request handler 313: if the current state is operational and either the data storage device is not a floppy disk or the sector address is within a protected volume of the floppy disk and either the volume state is not in the conversion process or the sector address is within that portion of the data storage device which has already been converted, then the decrypt operation is performed.

A decryption mechanism 322 operates in a manner analogous to the encryption mechanism 321. Any preprocessing of the data that is performed as part of encryption is inverted in a post-processing stage during decryption. As with encryption, the serializer 324 is used to mediate use of the token 325 for decryption. The serializer 324 is particularly important for use in decryption operations because the data storage device will have data available to be read at unpredictable times, causing asynchronous interrupts to occur, which if handled by the operating system at a sufficiently high priority, prevent the use of normal operating system synchronization and resource sharing techniques. Once data has been decrypted, control is returned to the IOS Manager 302 for delivery of the data.

A registry API hook 314 provides functionality that prevents modification of the registry stored on the protected volume (in the data storage device's cleartext portion) from which the operating system boots. The registry is a database file used by the Windows operating system and applications. Normally, the operating system reads the registry during boot-up, and then constantly modifies the registry during subsequent operating system operation. However, in accordance with the invention, the registry is part of the cleartext operating system data, so the state of the registry must be the same for each boot-up. The protect-mode hook accommodates these competing uses of the registry as follows. Alias files, corresponding to the registry area used to store changing but persistent data, are used once the operating system starts secure operation. These alias files are created when a protected volume is created. In operation, the RegLoadKey function is used to attach the alias files to the registry, all of the operating system registry APIs are intercepted, and all operations on registry keys are transformed into corresponding operations on keys within the alias files. The particular implementation of this functionality can be accomplished by one of skill in the art in view of the above description.

Figure 4:
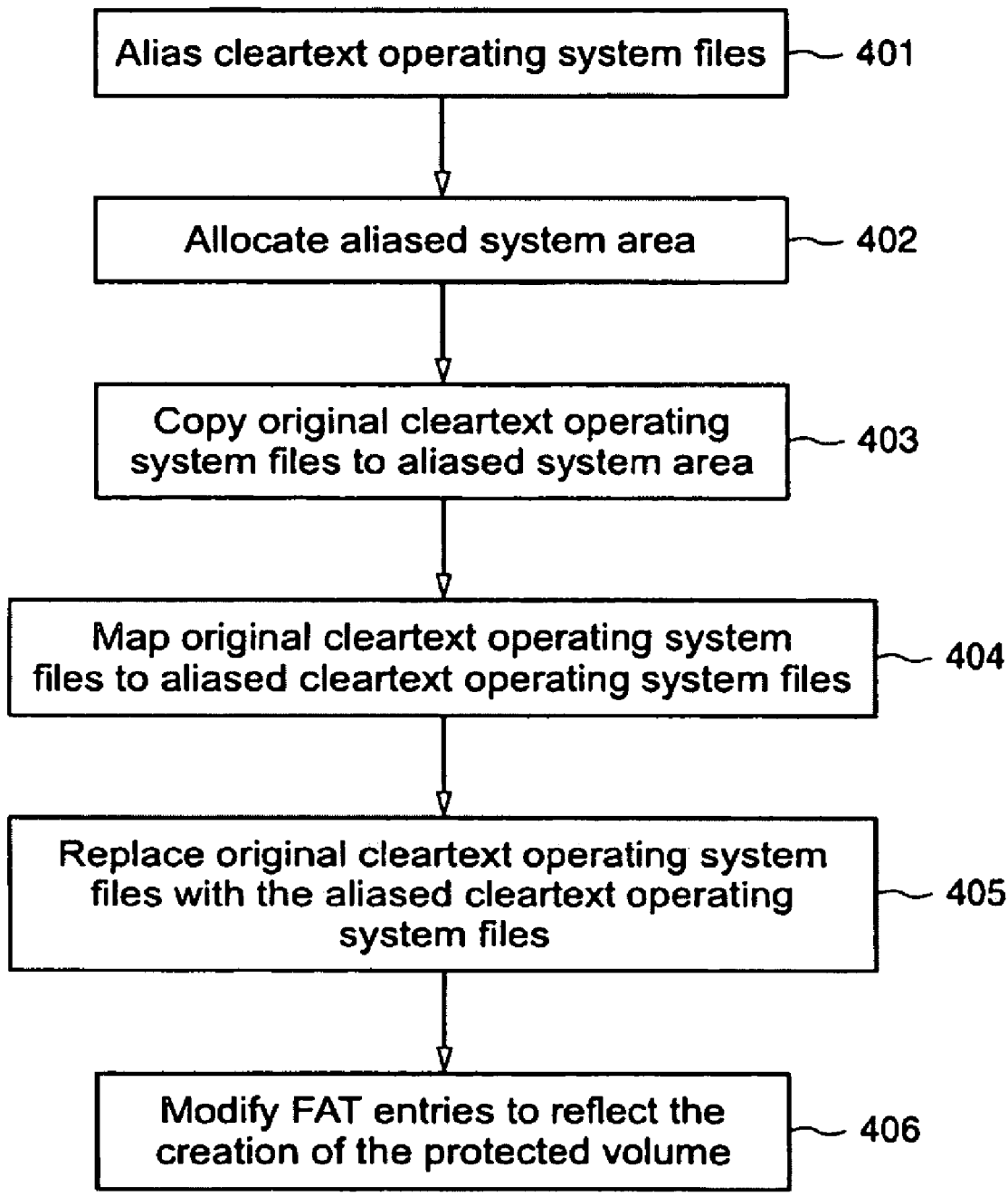
FIG. 4 is a flow chart of a method for modifying the structure of a data storage device for use in a method according to the invention for establishing a protected volume.

FIG. 4 is a flow chart of a method 400 for modifying the structure of a data storage device to establish a protected volume on the data storage device. The method 400 can be used in a method according to the invention for establishing a protected volume. For example, the method 400 can be used to implement the step 104 of the methods 100 (FIG. 1A), 110 (FIG. 1B) or 120 (FIG. 1C), or the step 219 of the method 200 (FIGS. 2A and 2B).

In step 401, the cleartext operating system files (i.e., the files recorded by the real-mode hook and protect-mode hook) are duplicated ("aliased"), including the directory structure associated with those files. A duplicate copy of the cleartext operating system files is necessary to enable those files to be stored both in a protected volume of the data storage device and an unprotected region of the data storage device, so that, when the computational device is used in a secure mode that allows access only to files within a protected volume, the functionality of the cleartext operating system files remains available to the computational device.

In step 402, an "aliased system area" is allocated. The aliased system area is within the allocated region of the disk that constitutes the protected volume. The size of the allocation for the aliased system area is determined as the sum of the sizes of the allocations for the file allocation tables, the root directory information and the boot record information. The allocation for the aliased system area can be made by locating a contiguous region of the data storage device of at least that size beginning with the last sector of the data storage device.

In step 403, the original cleartext operating system files are copied to the aliased system area. This is so, as indicated above, the functionality of the cleartext operating system files is available to the computational device when the computational device is constrained to access files only in a protected volume. Generally, either the original or the aliased cleartext operating system files can be stored in the aliased system area. However, it can be advantageous to store the original cleartext operating system files in the aliased system area because the logic required for such implementation is simpler than that for the alternative implementation, as can be appreciated by those skilled in the art. In step 404, a map is created defining a correspondence between the original cleartext operating system files (now stored within the region of the data storage device allocated to the protected volume) and the aliased cleartext operating system files. The map also contains a list of all sectors allocated to the unprotected region of the data storage device. This map is stored in the unprotected region of the data storage device.

In step 405, the aliased cleartext operating system files are used to replace the original cleartext operating D system files. This can be done by establishing pointers that identify the aliased cleartext operating system files as the operating system files to be normally used by the operating system during operating system boot.

In step 406, the file allocations (e.g., FAT entries) that are stored as part of the original cleartext operating system files are modified to reflect the creation of the protected volume. All file allocations that are for operating system files that are not part of the cleartext operating system files are rendered unusable (i.e., those file allocations are not allowed to appear as free clusters, nor are they allowed to point to locations within the protected volume). This can be done, for example, by marking the FAT entries for those files as "Bad" (using a special numerical value used for that purpose by the operating system) or by creating a file that includes pseudo-random data and causing the file allocations for those files to point to randomly selected clusters within the file including pseudo-random data.

Figure 5:
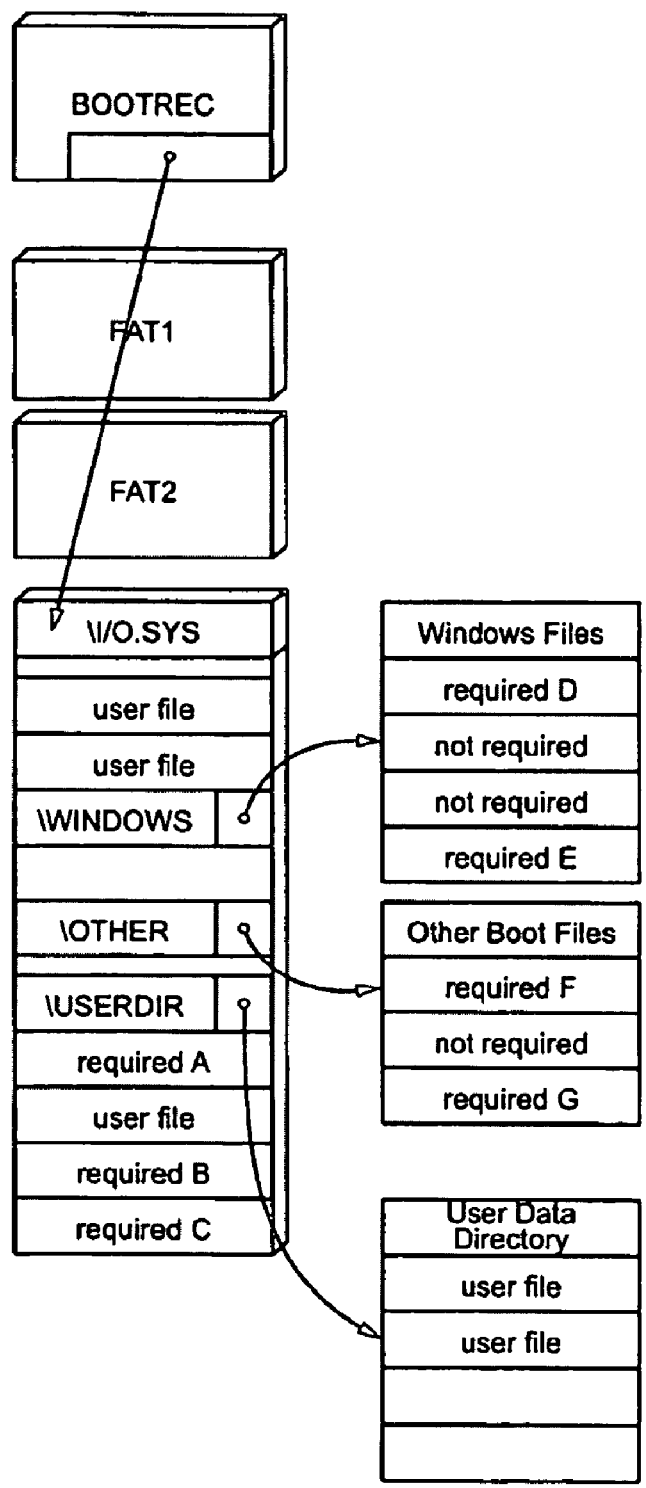
FIGS. 5 and 6 illustrate a structure of a data storage device before and after performance of a method according to the invention for establishing a protected volume.
Figure 6:
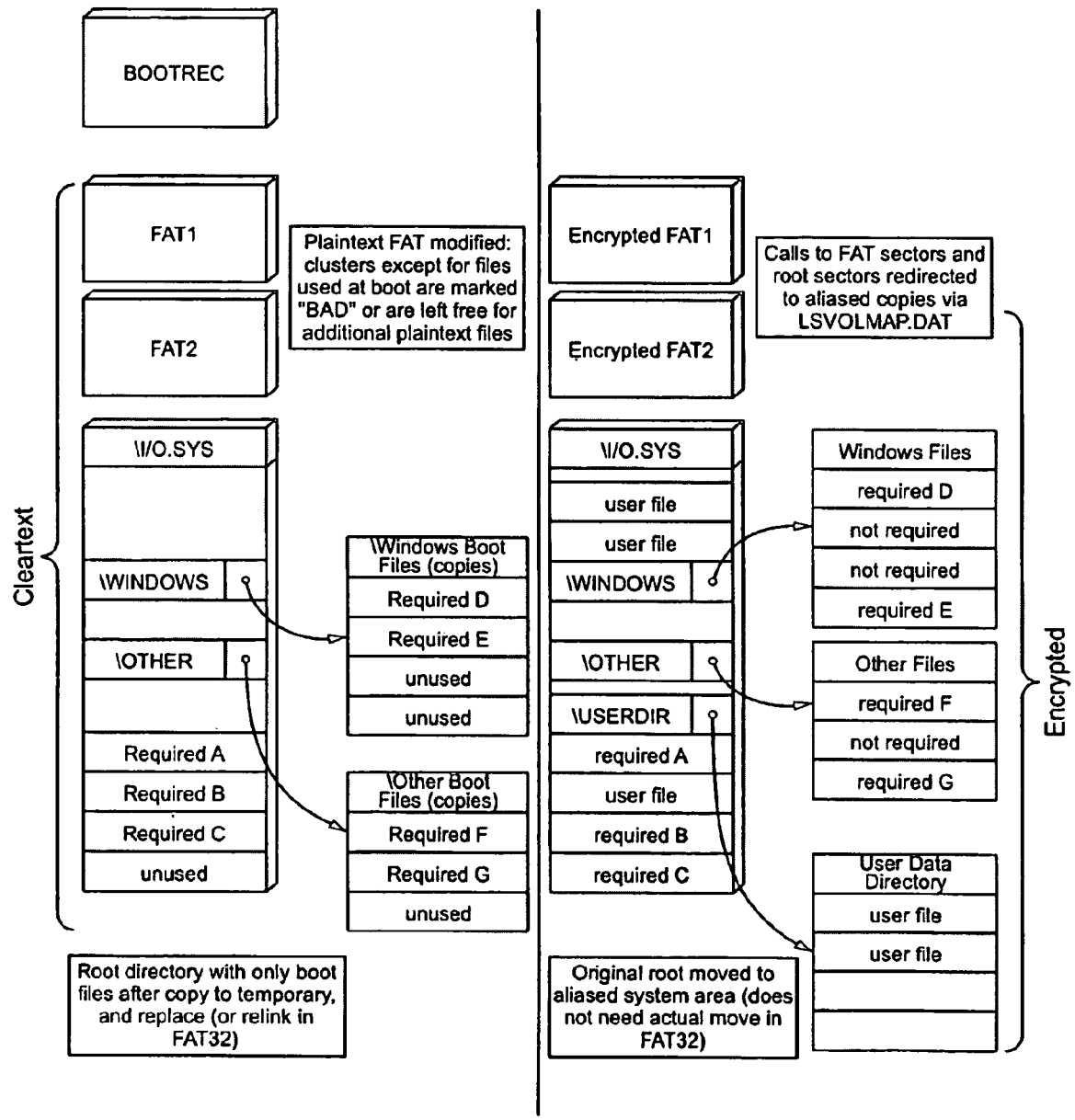

At this point, the structure of the data storage device has been modified to include a protected volume. FIGS. 5 and 6 illustrate a structure of a data storage device before and after performance of a method according to the invention for establishing a protected volume. Operation of the computational device can be constrained so that access can only be made to data stored within the protected volume.

A general method in accordance with the invention for modifying the structure of a data storage device is discussed above. TABLE I lists a specific sequence of steps in a method, according to a particular embodiment of the invention, for modifying the structure of a data storage device. The method described in TABLE I is applicable to modifying a data storage device associated with a computational device operated in accordance with a Windows operating system. For other operating systems, the particular manner in which modification of the structure of the data storage device is implemented can—and typically will—differ from the way of accomplishing that function as discussed below. However, those skilled in the art will appreciate, in view of the description herein, how to effect i such particular implementations.

TABLE I

1. Get level 1 volume lock (i.e., prevent modification of data storage device structures by operating system).
2. Read boot sector.
3. Read root directory.
4. Read file allocation table (FAT).
5. Keep track of secure clusters.
    5.1 Scan FAT and keep track of the used clusters. The record of used clusters is the secure cluster list.
6. Prepare file to hold aliased root directory (ROOTALIAS).
    6.1 Create a directory \ROOTALIAS and the following (empty) files: \SYSTEMAREA.DAT, \VOLUMEINTEGRITY.DAT, \ROOTALIAS\VOLUMEMAP.DAT.
7. Copy system files to ROOTALIAS.
    7.1 Go through the root directory and copy all system and hidden files to \ROOTALIAS.
8. Copy boot list files to ROOTALIAS.
    8.1 Call LOCK3295_GetBootOpenList( ) to get the list of file names and copy all the files which are present on the volume being converted to \ROOTALIAS.
9. Read FAT.
    9.1 Get an updated version of FAT that contains the allocation chains for ROOTALIAS and the newly copied files.
10. Read root directory.
    10.1 Get an updated version of the root directory.
11. Find contiguous clusters for SYSTEMAREA.DAT.
    11.1 Find sufficient contiguous free clusters to fit the system area file SYSTEMAREA.DAT, and link the clusters together in the FAT.
12. Modify directory entry for SYSTEMAREA.DAT.
    12.1 Modify the start cluster and file size in the SYSTEMAREA.DAT directory entry to reflect the space allocated to the file SYSTEMAREA.DAT in the previous step.
13. Add cluster to secure cluster list.
    13.1 Add the SYSTEMAREA.DAT clusters to the secure text list.
14. Allocate clusters for VOLUMEMAP.DAT.
    14.1 Estimate a file size to hold sector addressing information for 10 megabytes of volume space.

TABLE I-continued 14.2 Find contiguous cluster chain to fit the VOLUMEMAP file.
14.3 Keep track of the starting cluster and file size of VOLUMEMAP.
15. Allocate clusters for VOLUMEINTEGRITY.DAT.
    15.1 Estimate the file size for the VOLUMEINTEGRITY.DAT file. The size of this file is based on the number of cleartext files that require integrity information, plus some estimated additional space to accommodate other integrity information such as for subdirectories. Find sufficient contiguous clusters to accommodate this size file, and link the clusters together in the FAT.
    15.2 Modify the directory entry to indicate the cluster and file size for the file.
16. Add cluster to secure cluster list.
    16.1 Add the VOLUMEINTEGRITY.DAT clusters to secure cluster list.
17. Write root directory.
18. Write FAT.
19. Copy system area to SYSTEMAREA.DAT.
    19.1 Copy the system area from sector 0 to the end of the root directory. The FATs and root directory copied to this file are now referred to as the alias copies.
20. Move ROOTALIAS to root directory.
    20.1 Move the ROOTALIAS to the system root directory and mark the ROOTALIAS clusters as free in both system and alias FATs.
21. Walk the entire volume directory tree to get all cleartext sectors and write the list to VOLUMEMAP.DAT.
    21.1 Update the file information header and cleartext sector lists to VOLUMEMAP.DAT.
    21.2 Modify the VOLUMEMAP.DAT directory entry to indicate the file and file size.
    21.3 Scan the cleartext FAT. For each entry not in the cleartext cluster list and not zero, mark the cleartext FAT entry as "bad."
22. Re-parent ROOTALIAS to point to cluster 0.
    22.1 Go through the cleartext root directory and modify all ".." entries in each sub-directory, of the cleartext root directory to point to 0 cluster.
23. Reserve 10 megabytes of free space on the cleartext side.
    23.1 Scan the cleartext FAT from the bottom up. Reserve 10 megabytes of free space clusters by leaving them 0 and mark the rest of the cleartext FAT clusters not allocated to files as "bad."
    23.2 Scan the cleartext FAT. For each entry that is 0, mark the corresponding entry on the secure FAT (alias FAT) as "bad."
    23.3 Write all of the FATs to both cleartext and secure text sides.
24. Fill file slack spaces.
    24.1 Walk the cleartext root directory and subdirectories thereof. For each file, fill in random numbers from the logical end of file to the end of the last cluster allocated to the file. For each directory, fill each deleted and unused directory entry with random numbers, preserving the first byte of the entry.
25. Fill slack spaces in system area.
    25.1 Go to the end of the FAT sector and fill in the empty spaces with random numbers.
26. Fill free spaces in cleartext area.
    26.1 scan the cleartext FAT. For each free cluster fill in random numbers.
27. Hash system area and all free spaces.
    27.1 Perform a cryptographic hash on the cleartext system area and store the hash value in the volume integrity data.
    27.2 Perform a cryptographic hash on the volume free space and store the hash values in the volume integrity data.
28. Hash all files in cleartext area.
    28.1 Scan the root directory and subdirectories thereof. For each file and subdirectory, perform a cryptographic hash and store the hash value in the volume integrity data.
29. Write all hash data to the VOLUMEINTEGRITY.DAT.
    29.1 Write all volume integrity data records to VOLUMEINTEGRITY.DAT file.
30. Get level 3 volume lock, (i.e., prevent access to the data storage device by operating system).
31. Encrypt all clusters in the secure cluster list.
32. Unlock the volume.
33. Reboot system.

Once a protected volume has been established, secure operation of the computational device can take place. In FIGS. 2A and 2B, secure operation begins at step 228 in which the protect-mode driver begins to operate in secure mode.

Secure operation is provided by cryptographically processing data read from and written to a protected volume. Such cryptographic processing can be accomplished using any of a variety of known cryptographic techniques. For example, the cryptographic processing performed on the data stored within the protected volume can include one or more cryptographic key exchange operations (e.g., the Department of Defense Standard KEA, the RSA, the Diffie-Hellman, and the X9.42 (ANSI Banking Standard) key exchange algorithms), one or more hash operations (e.g., the FIPS 180-1 (SHA-1), the Message Digest 2 (RSA), and the Message Digest 5 (RSA) algorithms), one or more digital signature operations (e.g., the FIPS 186 (DSA-512, 1024) and the RSA Signature (512, 768, 1024, 2048) algorithms), one or more key wrapping operations for both symmetric and asymmetric keys, one or more symmetric encryption operations (e.g., the FIPS 185 (implemented completely in hardware), the DES (including 3DES, EDE3, CBC and ECB), the RC-2 and the RC-4 algorithms, Skipjack), one or more asymmetric (public key) encryption operations (e.g., the RSA and Diffie-Hellman algorithms), one or more exponentiation operations, or any combination of the above-described operations. Other cryptographic techniques can be used.

Additionally, the cryptographic processing can be accomplished using any of a variety of devices. For example, a computer program stored on a data storage device (e.g., hard disk) of the computational device can be executed by a processing device (which can be either a general purpose processing device used to perform other functions of the computational device, or a special purpose processing device dedicated to performing cryptographic processing) to perform cryptographic operations on the data stored within the protected volume. Or, a portable cryptographic token (which can be embodied in, for example, a PCMCIA card or smart card), on which cryptographic keys and computer programs are stored, and on which the cryptographic computer programs can be executed, can be connected to the computational device to enable communication therewith so that data from the protected volume can be transferred to and from the cryptographic token to enable performance of appropriate cryptographic operations on the data.

The commonly-owned, co-pending U.S. patent application Ser. No. 09/468,028, entitled "Event-Driven Serialization of Access to Shared Resources," by Gregg Weissman et al., filed on Dec. 20, 1999, and issued as U.S. Pat. No. 6,295,602 on Sep. 25, 2001, the disclosure of which is incorporated by reference herein, describes methods of enabling the processing of data stored on a protected volume by a cryptographic token.

A system administrator can specify one or more data protection parameters associated with the establishment of a protected volume. (Herein, a "system administrator" is any user authorized to specify one or more data protection parameters, discussed further below, associated with the establishment of a protected volume. Different classes of systems administrator can be established, each class having a different authorization level associated therewith that places particular limitations on how data protection parameters can be specified.) The most basic choice that a method according to the invention may present to a system administrator is whether to establish a protected volume or volumes at all. However, assuming that system administrator either chooses or is required to establish one or more protected volumes, there are a variety of other data protection parameters that a system administrator can specify. For example, a system administrator can define multiple volumes on one or more data storage devices, then further specify which of the volumes are to be protected. The system administrator can also specify which users are allowed to have access to a particular protected volume, or correspondingly, to which protected volumes a user is allowed to have access. In addition to providing protection for the other types of data storage devices discussed herein, the invention is capable of providing protection for data stored on a floppy disk in a manner similar to that described above.

To create a so-called "secure floppy disk," the invention first causes the complete erasure or format of the floppy disk using the operating system FORMAT command which also causes the creation of a standard floppy disk file system structure on the floppy disk.

Next, a list of users authorized to use the floppy disk for secure storage is created, in exactly the same manner as described above, using the same configuration software. This list of users is written to the user list file on the floppy disk. At that point, the floppy disk becomes available for secure use.

In operation, the IFS handler detects the insertion of a floppy disk via the operating system MOUNT operation. At such time, the floppy disk is examined to determine if the floppy disk is a protected disk. If the floppy disk is not a protected disk, the security software determines whether the system administrator has authorized the use of clear text floppy disks in the system, by checking a special flag stored somewhere in the system. If the flag indicates that the system administrator has configured the system to prohibit the use of clear text floppy disks, volume information for the floppy disk drive is set to indicate an access denied state, and all further system accesses to the floppy disk are prevented until another mount operation occurs for another floppy disk.

If the floppy disk is determined to be a secure floppy disk, then volume information for the floppy disk drive is set to indicate a protected state. This causes each disk request that is intercepted by the IO request handler to perform the following processing: the sector address of the disk request is checked, and if the sector address is a lower number than the starting sector of the floppy disk data area, then no encryption or decryption is performed. If the sector address is within the floppy disk data area, then encryption and decryption operations are performed, in essentially the same manner as for other types of data storage devices.

Various embodiments of the invention have been described. The descriptions are intended to be illustrative, not limitative. Thus, it will be apparent to one skilled in the art that certain modifications may be made to the invention as described above without departing from the scope of the invention.

The invention claimed is:

1. A method for providing a protected region of a data storage device associated with a computational device, the protected region being a region within which data cannot be accessed without proper authorization, the method comprising the steps of:
   providing, in an unprotected region of the data storage device, a first operating system and operating system data associated with the first operating system;
   monitoring operating system data accessed by the computational device until a predetermined functionality of the first operating system becomes available;
   storing, in the protected region, the monitored operating system data;
   providing, in the protected region, a second operating system;
   transferring control of the computational device, when the predetermined functionality of the first operating system becomes available, from the first operating system to the second operating system;
   storing data in the protected region; and
   preventing access to the stored data in the protected region without access authorization.

2. The method of claim 1, wherein the second operating system is different from the first operating system.

3. The method of claim 1, wherein the second operating system prevents unauthorized access to data stored in the unprotected region of the data storage device.

4. The method of claim 1, wherein the second operating system prevents decryption of data stored in the protected region without decryption authorization.

5. The method of claim 1, wherein the step of transferring control of the computational device from the first operating to the second operating system comprises the steps of:
- checking the operating system data stored in the unprotected region to determine whether the first operating system has been modified; and
- preventing unauthorized access to the data in the protected region if the first operating system data has been modified.

6. The method of claim 5, wherein the step of checking operating system data comprises the steps of:
- hashing operating system data to create a set of one or more hashes of the operating system data;
- comparing the set of one or more hashes of the operating system data to a set of one or more reference hashes previously stored in the protected region; and
- determining that the first operating system data has been modified if there is a difference in the comparison.

7. The method of claim 6, wherein the set of one or more reference hashes is determined from hashing reference operating system data.

8. The method of claim 6, wherein the set of one or more reference hashes is protected from undetected modification by authenticating one or more digital signatures.

9. The method of claim 1, wherein the step of transferring control of the computational device from the first operating to the second operating system comprises:
- authenticating a user identity using the first operating system, authenticating the user identity using the second operating system, or authenticating the user identity using both the first operating system and the second operating system.

10. The method of claim 1, wherein the step of preventing access to data in the protected region without access authorization comprises the steps of:
- receiving an identification of one or more volumes to be protected;
- receiving, for each identified volume to be protected, one or more data protection parameters;
- associating the one or more data protection parameters with the one or more identified volumes; and
- selectively providing access to protected data in the one or more identified volumes as a function of the authorization of a user and the data protection parameters.

11. A method for providing a protected region of a data storage device associated with a computational device, the protected region being a region within which data cannot be decrypted without authorization, the method comprising the steps of:
- providing, in an unprotected region of the data storage device, a first operating system and operating system data associated with the first operating system;
- monitoring operating system data accessed by the computational device until a predetermined functionality of the first operating system becomes available;
- storing, in the protected region, the monitored operating system data;
- providing, in the protected region, a second operating system;
- transferring control of the computational device, when the predetermined functionality of the first operating system becomes available, from the first operating system to the second operating system;
- encrypting data to be protected to create encrypted data;
- storing the encrypted data in the protected region; and
- preventing decryption of the encrypted data in the protected region without decryption authorization.

12. The method of claim 11, wherein the second operating system is different from the first operating system.

13. The method of claim 11, wherein the second operating system prevents unauthorized access to data stored in the unprotected region.

14. The method of claim 11, wherein the second operating system prevents access to encrypted data stored in the protected region without access authorization.

15. The method of claim 11, wherein the step of transferring control of the computational device from the first operating to the second operating system comprising the steps of:
- checking operating system data stored in the unprotected region to determine whether the first operating system has been modified; and
- prohibiting unauthorized decryption of the data in the protected region if the first operating system has been modified.

16. The method of claim 15, wherein the step of checking operating system data comprises the steps of:
- hashing operating system data to create a set of one or more hashes of the operating system data;
- comparing the set of one or more hashes of the operating system data to a set of one or more than one reference hash previously stored in the protected region; and
- determining that the first operating system data has been modified if there is a difference in the comparison.

17. The method of claim 16, wherein the set of one or more than one reference hash is determined from hashing reference operating system data.

18. The method of claim 16, wherein the set of one or more than one reference hash is protected from undetected modification by authenticating one or more digital signatures.

19. The method of claim 11, the step of transferring control of the computational device from the first operating to the second operating system comprising the step of:
- authenticating a user identity using the first operating system, authenticating the user identity using the second operating system, or authenticating the user identity using both the first operating system and the second operating system.

20. The method of claim 11, the step of preventing decryption of data in the protected region without decryption authorization comprising the steps of:
- receiving an identification of one or more volumes to be protected;
- receiving, for each identified volume to be protected, one or more data protection parameters;
- associating the one or more data protection parameters with the one or more identified volumes; and
- selectively providing decryption of data on the one or more identified volumes as a function of the authorization of a user and the data protection parameters.

21. An apparatus for providing a protected region of a data storage device associated with a computational device, the protected region being a region within which data cannot be accessed without authorization, the apparatus comprising
- a memory,
- a computational device, and
- one or more computer-readable instructions stored in the memory, wherein, when said computer-readable instructions in the memory are accessed and executed by the computational device, the apparatus is operative to:
  - provide, in an unprotected region of the data storage device, a first operating system and operating system data associated with the first operating system;

monitor operating system data accessed by the computational device until a predetermined functionality of the first operating system becomes available;

store, in the protected region, the monitored operating system data;

provide, in the protected region, a second operating system;

transfer control of the computational device, when the predetermined functionality of the first operating system becomes available, from the first operating system to the second operating system;

store data in the protected region; and prevent access to the stored data in the protected region without access authorization.

22. An apparatus for providing a protected region of a data storage device associated with a computational device, the protected region being a region within which data cannot be decrypted without authorization, the apparatus comprising a memory, a computational device, and one or more computer-readable instructions stored in the memory, wherein, when said computer-readable instructions in the memory are accessed and executed by the computational device, the apparatus is operative to:

provide, in an unprotected region of the data storage device, a first operating system and operating system data associated with the first operating system;

monitor operating system data accessed by the computational device until a predetermined functionality of the first operating system becomes available;

store, in the protected region, the monitored operating system data;

provide, in the protected region, a second operating system;

transfer control of the computational device, when the predetermined functionality of the first operating system becomes available, from the first operating system to the second operating system;

encrypt data to be protected to create encrypted data;

store the encrypted data in the protected region; and prevent decryption of the encrypted data in the protected region without decryption authorization.

23. A non-transitory computer readable media for providing a protected region of a data storage device associated with a computational device, the protected region being a region within which data cannot be accessed without authorization, the computer readable media providing one or more computational device instructions to be stored in a memory, wherein, when said computational device instructions stored in the memory are accessed and executed by the computational device, the instructions are operative to:

provide, in an unprotected region of the data storage device, a first operating system and operating system data associated with the first operating system;

monitor operating system data accessed by the computational device until a predetermined functionality of the first operating system becomes available;

store, in the protected region, the monitored operating system data;

provide, in the protected region, a second operating system;

transfer control of the computational device, when the predetermined functionality of the first operating system becomes available, from the first operating system to the second operating system;

store data in the protected region; and prevent access to the stored data in the protected region without access authorization.

24. A non-transitory computer readable media for providing a protected region of a data storage device associated with a computational device, the protected region being a region within which data cannot be decrypted without authorization, the computer readable media providing one or more computational device instructions to be stored in a memory, wherein, when said computational device instructions stored in the memory are accessed and executed by the computational device, the instructions are operative to:

provide, in an unprotected region of the data storage device, a first operating system and operating system data associated with the first operating system;

monitor operating system data accessed by the computational device until a predetermined functionality of the first operating system becomes available;

store, in the protected region, the monitored operating system data;

provide, in the protected region, a second operating system;

transfer control of the computational device, when the predetermined functionality of the first operating system becomes available, from the first operating system to the second operating system;

encrypt data to be protected to create encrypted data;

store the encrypted data in the protected region; and prevent decryption of the encrypted data in the protected region without decryption authorization.

* * * * *